United States Patent
Wray et al.

(10) Patent No.: US 6,442,696 B1
(45) Date of Patent: Aug. 27, 2002

(54) SYSTEM AND METHOD FOR EXTENSIBLE POSITIVE CLIENT IDENTIFICATION

(75) Inventors: David Robert Wray; David John Blanchfield, both of West Yorkshire (GB)

(73) Assignee: Authoriszor, Inc., Leeds (GB)

(*) Notice: Subject to any disclaimer, the term of this patent is extended or adjusted under 35 U.S.C. 154(b) by 0 days.

(21) Appl. No.: 09/412,242

(22) Filed: Oct. 5, 1999

(51) Int. Cl.$^7$ ................................................ H04L 9/32
(52) U.S. Cl. ........................................ 713/201; 713/176
(58) Field of Search ................................ 713/200, 201, 713/155, 156, 159, 191, 180; 705/56; 709/226, 228, 225, 227, 229

(56) References Cited

U.S. PATENT DOCUMENTS

| | | | |
|---|---|---|---|
| 4,933,971 A | * 6/1990 | Bestock et al. | ............ 380/44 |
| 5,337,357 A | * 8/1994 | Chou et al. | ............ 705/56 |
| 5,717,756 A | 2/1998 | Coleman | |
| 5,745,568 A | 4/1998 | O'Connor et al. | |
| 5,754,938 A | 5/1998 | Herz et al. | |
| 5,754,939 A | 5/1998 | Herz et al. | |
| 5,757,924 A | 5/1998 | Friedman et al. | |
| 5,761,305 A | 6/1998 | Vanstone et al. | |
| 5,764,906 A | 6/1998 | Edelstein et al. | |
| 5,771,287 A | 6/1998 | Gilley et al. | |
| 5,771,291 A | 6/1998 | Newton et al. | |
| 5,835,087 A | 11/1998 | Herz et al. | |
| 5,835,718 A | 11/1998 | Blewett | |
| 5,857,021 A | 1/1999 | Kataoka et al. | |
| 5,877,765 A | 3/1999 | Dickman et al. | |
| 6,023,762 A | * 2/2000 | Dean et al. | ............ 713/913 |
| 6,134,659 A | * 10/2000 | Sprong et al. | ............ 713/190 |
| 6,169,976 B1 | * 1/2001 | Colosso | ............ 705/59 |
| 6,314,521 B1 | * 11/2001 | Derby | ............ 713/201 |

OTHER PUBLICATIONS

Snare Works Public Key Authentication by Intellisoft Feb. 13, 1998 Intellisoft Corp.
The Intel Processor Serial Number Letters Jul. 1, 1999, Junkbusters.
Secure Server and Commercial Activities, Nov. 24, 1998. Netscape Corp.
Building a Corporate Public Key Interface Mar. 15, 1999 infoseceng.com.

* cited by examiner

*Primary Examiner*—Gail Hayes
*Assistant Examiner*—Christopher A. Reyak
(74) *Attorney, Agent, or Firm*—Hale and Dorr LLP

(57) ABSTRACT

A system and method that provides electronic security over a network through an extensible positive client identifier (EPCI), working with a positive information profiling system (PIPS), pseudo uniform resource locators (PURLs) to assist in providing data integrity, a virtual page publication system (VPPS), and an active security responder, (ASR). The extensible positive client identifier (EPCI) creates a unique client identification key and continually self-evaluates the key based on unique system signature data. The positive information profiling system implements account profiles for all content and clients so that pages of information can be generated and matched to the data requested as well as the requester. The virtual page publication system VPPS of the invention does not store pages permanently in the root directory of the site but instead creates temporary web pages dynamically containing the level of information resulting from the client identification, PIPS, and PURL evaluations. The virtual page is sent, (in encrypted form if this option has been selected or if this option is required by the PIPS profile), to the requestor and exists only for the time necessary to send it. The active security responder (ASR) controls the overall operation of the present invention.

34 Claims, 15 Drawing Sheets

Figure 3 (Prior Art)
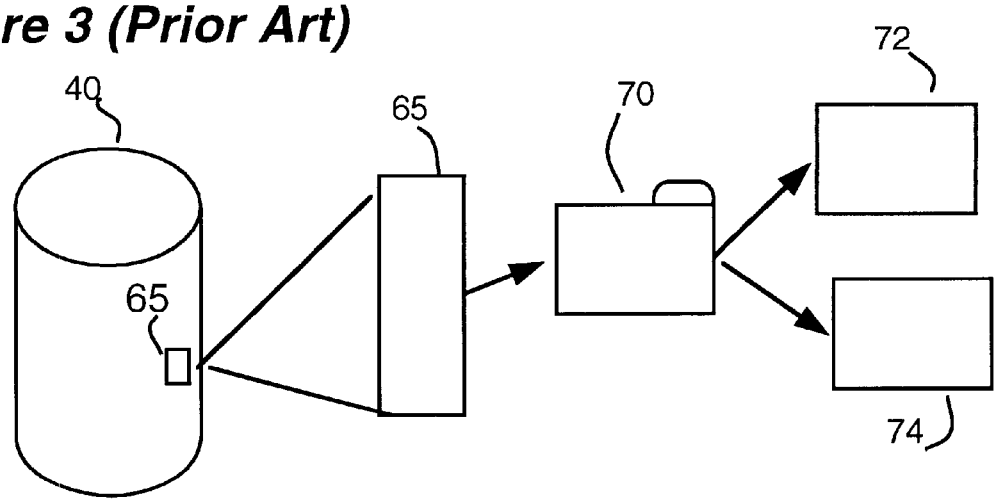
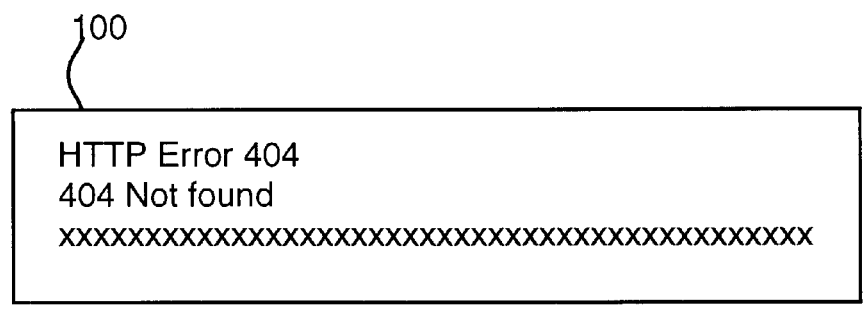
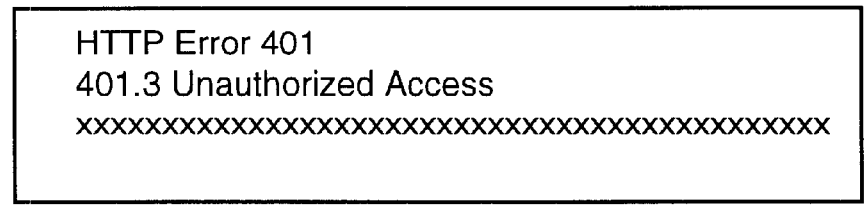

| APK | Authorized Personalization Key for this relationship |
|---|---|
| ACAK | Authorized Client Activation key for this relationship |
| CIKVER | Version of CIK |
| CIKSTATUS | Result of client evaluation of itself |
| Date at client | Local Date |
| Time at client | Local time |
| Client ID | Unique client security identifier |
| Client IP Adderess(es) | IP client setting(s) for this machine |
| Machine name | Network name of machine |
| Local logon name | Name of currently logged on user |
| Sound system Info | Data from sound system, if present |
| Video system info | Data from video display |
| System user name | Optional if logon required |
| System user password | Optional if logon required |
| System Signature | Depends on unique configuration of client machine |
| Pingtime | Time in milliseconds to contact server |

Client Profile for Fred Smith's Machine

| Scripting | Intruder alerts |

| Access Time Profile 1 | Access Time Profile 2 |

| Properties Primary | Security Profile | Actions | Subs/Tags |

Name

Fred Smith's Machine

Client Type
Machine ●     User ○

E-mail address fredsmith@somewhere.com

Description

Manufacturer of computers

Registration    Last access    hot desk? Y

22/03/1999 6PM    13/04/1999 9AM

Account Grps   Member of:    Not member of:

| All Clients<br>Computer Dealers | Customers<br>Computer super dealers |

[ OK ] [ Gen ACAK ] [ Apply ] [ Cancel ] [ Help ]

SYSTEM AND METHOD FOR EXTENSIBLE POSITIVE CLIENT IDENTIFICATION

BACKGROUND OF THE INVENTION

1. Technical Field

The present invention relates generally to the field of providing security for a location in a network and more particularly to an extensible positive client identification system and method.

2. Background

The Worldwide Web (web), web browser, and email technologies have transformed the Internet public telecommunications network into a tool for everyday use. While businesses have used a variety of computer and private network technologies for several decades, often creating valuable databases and internal files in the process, web technologies have now made it possible for businesses to use such corporate data on the Internet for competitive advantage. Commercial transactions that used to be done through face to face meetings and negotiations, for example, can now be done electronically via the Internet—at least in theory. In practice, the more significant the transactions are, and the more sensitive the data involved, the more likely it is that security on the Internet (or any network) becomes a problem.

Ideally, electronic security addresses three requirements:
1. Confidentiality—the prevention of the unauthorized disclosure of information;
2. Integrity—the prevention of the unauthorized modification of information; and
3. Availability—the prevention of the unauthorized withholding of information.

In practice, current methods tend to fall short of the degree of certainty or comfort needed in one or more of these areas for many commercial or higher risk transactions.

Confidentiality, for example, begins by identifying the requestor of confidential information. This, in turn, means not only identifying a valid requester, but also detecting when an imposter or thief is impersonating a valid requestor to gain access to confidential information. In many cases it is also true that a valid requestor may only be authorized to have access to a particular level of information. An employee database, for example, which contains salary information may have several different levels of access. An individual employee may only be authorized to access his or her salary information, while the head of the personnel department may have access to all salary data. Non-employees may be denied access to any employee data— hence the importance of identification.

Data integrity is required to safeguard the data being requested. Computer hackers (those who seek to break through security safeguards either for amusement or theft), may try to corrupt data at the host computer by seeding computer viruses (programs that destroy files and data at the host site), corrupting data, replacing data with false information or by depositing "trojans"—software that appears to be useful but in fact does harm. Hackers can also try to intercept and corrupt data as it is being transmitted to a remote site. After transmission, a hacker may try to corrupt the data stored at the remote site.

Availability means simply that information should not be withheld improperly when it is requested. Many factors can affect availability over a network, such as hardware malfunction, software malfunction, data corruption, or the failure or slowing down of communications links.

While there are some existing measures and tools designed to address computer and network security, many of these have significant weaknesses. For example, one of the most popular methods of user identification for computers and networks is the use of a logon name and password. As seen in FIG. 2 (Prior Art), a computer user at a personal computer terminal 00 may want to connect over private network lines 10, to communicate with another user at terminal 02 within the private network. Computer software allows the user at terminal 00 to log onto the computer by using a dialogue screen that requests his or her user name and password. For a hacker to "crack" or break this kind of system thus requires knowledge of a valid user name and password combination.

The logon name and password approach has a number of weaknesses. First, logon names are usually very easy to discover. Many organizations select a standard format for them based on the user's real identity. Fred Smith, for example, may be given a logon name of "fsmith" or "freds". A hacker familiar with a user's real name may find it easy to deduce this kind of logon name. Many computer systems that require logon names also have default settings that are used when the system is first configured. Many users simply keep these default account names. Thus, a hacker familiar with the NT™ operating system provided by Microsoft, Inc. of Redmund Washington, might try the 'Administrator' account. Default account names and passwords greatly reduce the amount of work required for the hacker to gain illicit entry to a system. Hackers may use software attacks to obtain passwords by copying password files.

Users often reveal their passwords accidentally by writing them down or by being observed during password entry. Some may deliberately disclose their passwords to a colleague so he or she can carry out a task on the user's behalf. Others will use the names of pets, family members, birthdays, etc., in order to make them memorable.

Unfortunately, this also makes them easier for others to guess. Most computer systems allow an administrator to define the type of passwords to be used. However, the more complex the requirements are, the more likely the user is to write it down and display it conspicuously near the terminal, simply because the user cannot remember it.

Many organizations have relied on the logon name and password approach for their internal networks, because for most of these organizations, most potential hackers are internal employees who are not likely to do significant damage to the corporation. However, as these organizations allow access from outside the company, using the Internet 25 of FIG. 2 (Prior Art)—or other networks—sole reliance on logon names and passwords can ultimately lead to a total breach of security and all its consequences.

Some corporations have also used hardware keys (also known as "dongles") connected to each computer terminal to identify users and prevent unauthorized access. While this is an improvement over the simple logon name and password approach, these can usually be circumvented fairly easily by a hacker who examines what the hardware key does and emulates it in software.

Digital Identifiers (Digital IDs), Digital Certificates and Trusted Third Party Certificate Authorities (TTPCA) are more sophisticated methods used in the industry to enhance identification and security over the Internet. There are various industry standards associated with this technology, the most notable at this time being ANSI standard X.509 version 3. For the purposes of this discussion, the terms Digital IDs and Digital Certificate are used interchangeably. A Digital Certificate is a series of characters containing an identifier and usually other verification information. The certificate or id may be stored in a computer file—as seen in FIG. 2 (Prior Art), at disk 03 connected with a computer terminal 02, or on some other memory device such as a smart card. When the id is read by the appropriate software it is possible to use that id for identification purposes. Usually these ids are constructed in such a way that if they are tampered with and any of the characters are changed the reading software will confirm this and inform the requesting software. Thus, the techniques currently in use are sophisticated enough to insure that a certificate is complete and unaltered. Thus, they also provide an excellent basis for encryption of information.

However, digital certificates can be copied from a computer terminal 02 such as the one shown in FIG. 2 (Prior Art), and used to impersonate the user. They can also be stolen remotely while the user is using the Internet. For example, a hacker at terminal 13 can use the Internet 25 and communications networks 30 and 10 to find and copy a certificate stored on a disk at personal computer terminal 02.

Trusted Third Party Certificate Authorities (TTPCA) can be used to create and issue digital certificates for a company. To obtain a certificate from a certificate authority usually requires proof of identity. The certifying authority then uses its own digital certificate to generate one for the requestor. The degree of stringency and cost varies from authority to authority. At the highest levels of security, it can take several months to obtain one, and require high levels of proof of identity as well as expense. Certificates for large corporations for example, can cost as much as $10,000 USD. At the other extreme, some companies will issue them for as little as $10 and require no proof of identity.

If a user holds a certificate and believes it may have been stolen or compromised then it informs the certificate authority which will usually revoke the user's current certificate and issue it another one. Certificates thus offer a higher degree of protection, but are still fairly vulnerable, either through copying or interception of transmissions. In theory, a check should be made with the appropriate Certificate Authority before the customer relies on the certification. The Certificate Authority might have already revoked the certificate. In practice this is a step that many application programs fail to take when certificates are used. Detection of the theft or interception may not take place until after some significant damage has occurred.

As mentioned above, smart cards can also be used to enhance identification. Some of these are similar to magnetic strip credit cards which can be read by insertion or swiping in a card reader. Smart cards are usually used in conjunction with some other type of user input, such as name, password, or Personal Identification Number (PIN) number. The simplest cards are low cost but may be easily duplicated. More complex smart cards have built-in data storage facilities and even data processing facilities in the form of embedded computer chips allowing additional user information to be stored, thus providing a higher level of user verification. These tend to cost more and be more difficult to duplicate. The most secure cards have very sophisticated verification techniques but include a higher cost per individual user.

Another method of identification uses simple fixed system component serial numbers. In the example of FIG. 2 (Prior Art), a computer manufacturer, (such as Intel) of a personal computer processor chip such as that shown as terminal 05, may have embedded a serial number in the processor. This number can then be read to identify that particular personal computer terminal 05. While this tends to be much more specific at identifying a terminal, it also raises privacy questions, since the terminal 05 can be identified by anyone using appropriate methods over the Internet. This has led to the creation of a software program that switches off the serial number facility. This approach to identification thus creates some concerns about privacy and also about the ability for the feature to be switched on and off without the user's knowledge.

Along similar lines, Internet Protocol (IP) addresses can be used for identification with systems using the Terminal Control Protocol/Internet Control Protocol (TCP/IP) communication protocol of the Internet. To be part of such a TCP/IP network requires that each computer have a unique IP address, using a specified format. Each IP computer, in turn, is a member of a domain. Domains can be part of another network, as a subnet or can even contain subnets. These IP properties are exposed during every network access. Basic firewall systems 15, as seen in FIG. 2 (Prior Art) use these properties to allow or refuse access to a computer system. Computer users of the AMERICA ONLINE™ (AOL™) internet service, from America Online, Inc. of Dulles, Va., for example, are all members of the AOL™ domain.

Many companies and Internet Service Providers (ISP) such as AOL™ only allow Internet access through a proxy server. The IP address that appears when proxies are used will be that of the proxy server machine. For users of AOL, for example, AOL™'s proxy server IP address will be the only IP form of identification for the many millions of users. This is not conducive to discrete identification.

Proxy servers may also be used by hackers to reach a user's computer. Hackers, for example, can impersonate an IP address, until they find an IP address of the user's that works for their purposes.

Biometric identification techniques are now becoming available, such as fingerprints, voiceprints, DNA patterns, retinal scans, face recognition, etc. While the technology exists in many cases to use this type of information, it is usually not presently available in a practical form or is too expensive for many applications. Many hackers will simply view it as a challenge to find ways to copy, intercept, or fake these forms of identification.

In addition to the identification problems outlined above, companies seeking to use the Internet and the web for commercial purposes, also need to control the creation, modification and deletion of data that is requested or used on a website or network location. In the example shown in FIG. 2 (Prior Art), a corporate website 35 (usually composed of a computer system, operating system software, webserver software and web application software) may have valuable confidential information stored on local memory such as disk 40.

Computers hold programs and data in objects usually called files or data sets. As seen in FIG. 3 (Prior Art), files 72 and 74 are usually organized logically in folders 70 that are, in turn referenced by directories 65—all of which is stored physically on local memory such as disk 40. In most file structures provided by present day operating systems, folders can also be placed inside other folders or directories, allowing files to be logically grouped together on a disk 40, just as they might be stored in cardboard folders in file cabinets if they were physically kept on paper. The authority to use a computer's files is based on identification of the user and the permissions and rights that have been given to that user, usually by a system administrator. For example, as seen in FIG. 3 (Prior Art) an operating system might have the scope of permissions and rights outlined in table T1. For these files a user might be denied any access which would be indicated at line 80 of table T1.

If this same security profile typing is applied to web pages, as it is by many websites today, a requester without the proper permissions receives messages such as those shown in FIG. 3 (Prior Art) at 100 and 105. In some instances, messages such as these may alert a hacker to the kinds of information that require more rights, and provoke him or her into spending more time attempting to gain illicit access.

One approach to data integrity is provided by Virtual Private Networks (VPNs), which were conceived as a method of providing more secure remote access to users. VPN permission levels closely resembled the same functionality and permission levels that local users of the computer or network would have had. VPNs create secure links between two (or more) computers, which identify each other and then create encrypted pathways between them using sophisticated encoding techniques. Once the links have been created, they may be regarded as nearly hacker-proof for all practical purposes. However, while VPNs can create secure links between computers and/or terminals on a network, the link may be based on client identification methods that are vulnerable to attack, such as the logon name and password approach, mentioned above. Thus VPNs can be subverted by false identifications into creating confidential sessions with a hacker.

Firewalls are another form of network security that have been developed to address data integrity. Firewalls are usually essential requirements for any computer or computer network which can be accessed remotely. A firewall is typically a computer system placed between two networks and connected to both. One of the networks is usually an internal corporate network which is reasonably secure. The other network is usually a public network, such as the Internet, which may be fraught with peril—at least from a security viewpoint. The software in the firewall computer usually provides protection from certain kinds of intrusions into the internal network by:

denying service, closing off access to internal ports or computers, denying access to certain protocols, or filtering messages (examining the content of a message to determine whether or not to accept it).

In FIG. 2 (Prior Art), computer 15 might be a firewall computer which is placed between terminals 00 and 02 on private network 10 and the Internet 25 and public communication links 30. The internal, private network is considered the "clean" network, and the external, public one the potentially "dirty" one.

While firewalls fend off many attacks, some forms of attack can be difficult to detect, such as file deposition attacks, in which an internal computer or system is gradually filled with unwanted data which will eventually affect performance or even stop the computer or network from working. Since most current firewall technologies will detect and prevent large files being uploaded onto an internal computer or network, a knowledgeable hacker will upload a number of very small files within the size acceptable to the firewall, eventually causing the computer's disk storage space to become insufficient and the system to degrade or fail.

A trojan is an extreme example of a file deposition attack—the file being deposited is a program that appears useful but will in fact damage or compromise data integrity and system security when it is used.

No matter how effective a firewall or VPN connection is, it is likely that a determined intruder can find a way to access a website for nefarious purposes. In a sense, the protocol of the Internet itself abets this, particularly its HTTP (Hypertext Transfer Protocol) and related protocols. This is the method used by websites on the worldwide web to publish pages to a web browser at a user's personal computer terminal. Uniform Resource Locators (URLs) are used to implement this. As seen in FIGS. 4A and 4B (Prior Art), block 110, the URL describes where to find and how to use a resource on the Internet. In the example of FIGS. 4A and 4B (Prior Art), the "http://" indicates that the resource must be accessed using the http protocol. "www.w3.org" is the Internet name of the computer on which the page is to be found and along with its web root directory. "Addressing" is a directory found in the web root directory, and "URL" is a directory found in the directory called "Addressing". The page being published is found in the directory "URL" and the page name is "Overview.html". This general structure applies to all URLs and enables anyone with a web browser to reach information on the Internet. Thus, any website must at least have a web root directory if it is to be accessed over the Internet. This means that hackers can find any website on the Internet and access web root directories. Once a web root directory is found, hackers can usually use port scanners or other techniques to locate the vulnerable areas of a website and deploy attacks against them or copy them for illicit purposes.

As mentioned above, file deposition attacks can be used to slow down, to subvert an application, or to completely disable a website or system. A hacker, for example, can take an initial, legitimate web page and replace it with a page of the same name that asks for improper actions or allows access to confidential data. This affects the third function of security, namely availability. While a number of technologies such as redundant computer and disk systems have been developed to maintain high availability of systems and networks, sabotage by hackers or others can bring whole systems down.

Most current security systems and methods also embody some assumptions about would-be intruders. For example, many systems will deny access to an intruder once he or she has been detected. While the system designers know that this often does not deter an intruder, but may actually provoke one, an assumption of this approach is that the intruder who has been detected knows he or she will have to work harder and might give up to search for other prey. In present-day cryptography, for example, it is assumed that most ciphers or encryption techniques can be decoded or decrypted, given a sufficient amount of time, money, and computer "horsepower." In other words, it is extremely difficult to make a security system unbreakable, but it can be made more difficult and costly to break. Implicit in these approaches is a defensive posture that tries to build computer systems and networks that are impregnable fortresses. They often fail to take into account the fact that telling an intruder it has been caught and denying access, in many cases provides valuable information to the intruder about which of its tools and attack plans are ineffective. The intruder who breaks in for amusement may actually regard these measures as a challenge. The criminal can use them for information.

It is an object of the present invention to provide a security system that positively identifies an authorized client.

It is another object of the present invention to provide a system for detecting interlopers.

SUMMARY

These and other objects are achieved by a system for providing electronic security over a network through an extensible positive client identifier (EPCI), working with a positive information profiling system (PIPS), pseudo uniform resource locators (PURLs) to assist in providing data integrity, a virtual page publication system (VPPS), and an active security responder, (ASR). The extensible positive client identifier (EPCI) system creates a unique client identification key and continually self-evaluates the key based on unique system signature data. The positive information profiling system implements account profiles for all content and clients so that pages of information can be generated and matched to the data requested as well as the requestor. The virtual page publication system VPPS of the invention does not store pages permanently in the root directory of the site but instead creates temporary web pages dynamically containing the level of information resulting from the client identification, PIPS, and PURL evaluations. The virtual page is sent, (in encrypted form if this option has been selected or if this option is required by the PIPS profile), to the requestor and exists only for the time necessary to send it. The active security responder (ASR) controls the overall operation of the present invention.

BRIEF DESCRIPTION OF THE DRAWINGS.

FIG. 3 (Prior Art) is a block diagram of typical directories and error messages of the prior art.

FIG. 6 is a table showing the elements of a Client Identifier Key (CIK) of the present invention.

FIG. 7 is a block diagram showing sample numeric values for a client identifier key (CIK).

FIG. 15 is a block diagram of an illustrative screen display used by the PIPS processing of the invention.

DETAILED DESCRIPTION OF THE INVENTION

Figure 1:
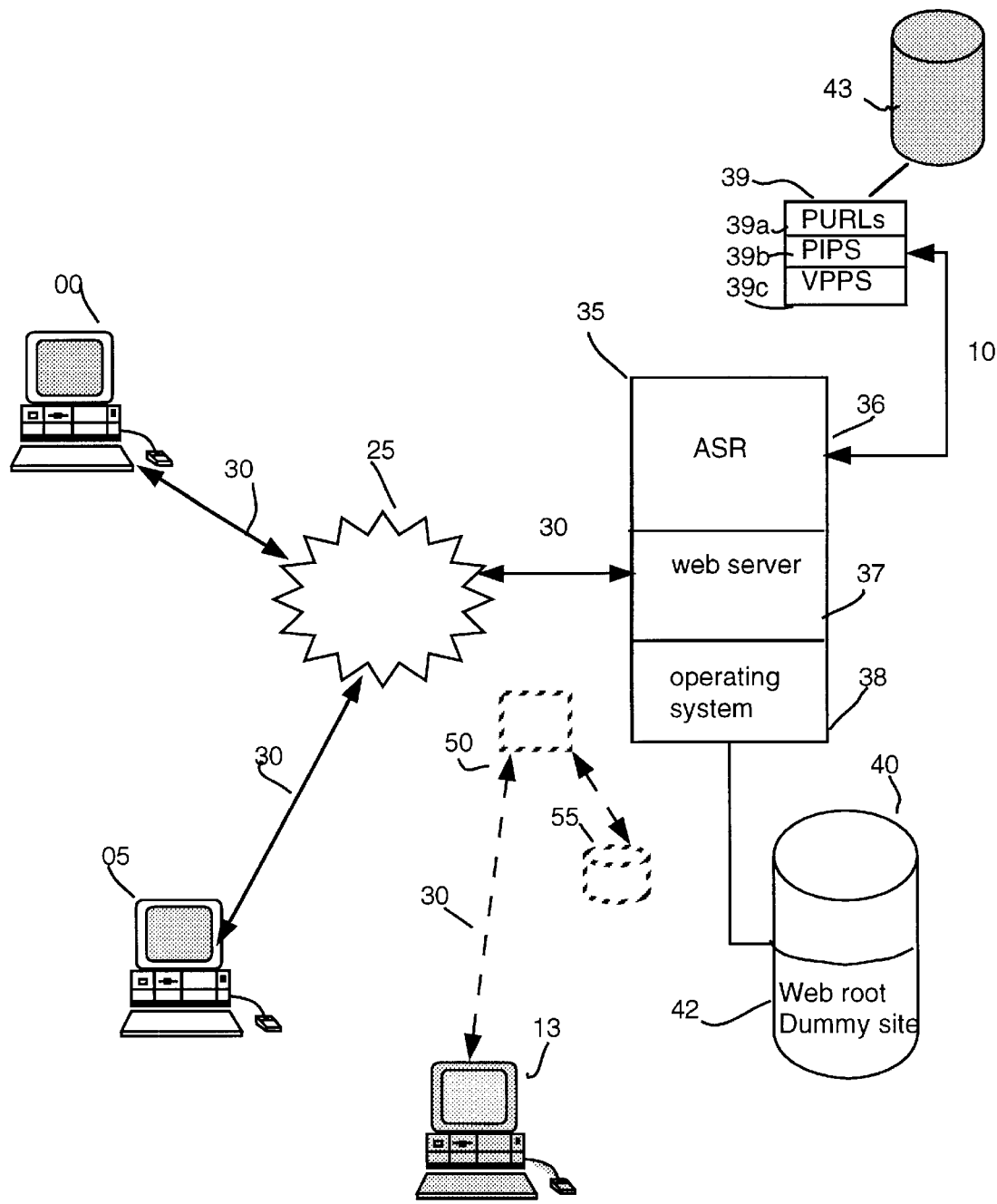
FIG. 1 is a block diagram of the present invention.
Figure 2:
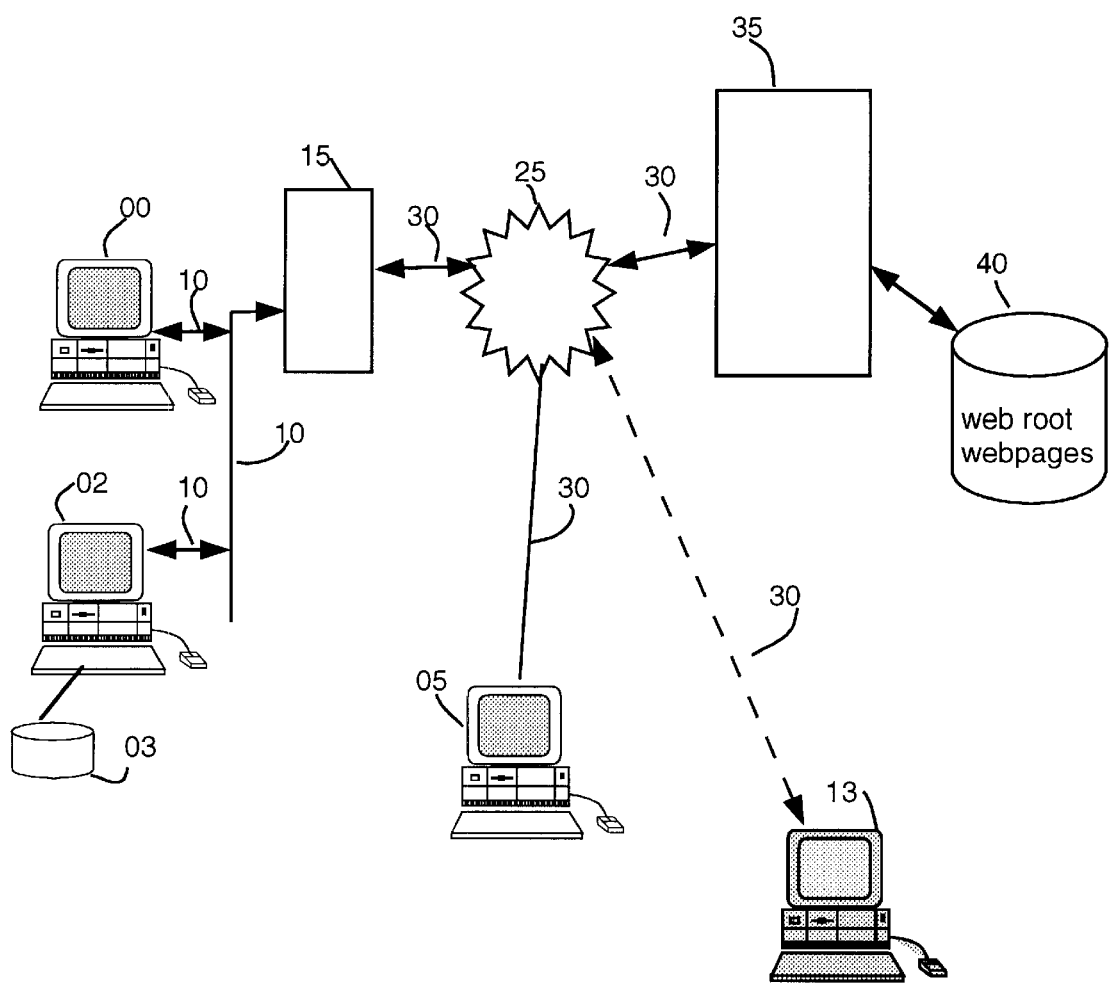
FIG. 2 (Prior Art) is a block diagram of prior art web page technology.

In FIG. 1, an overview of the present invention is shown. User computer terminals 00 and 05 are shown connected by public communications lines 30 to the Internet 25. Also shown is a website 35, which is accessible over the Internet 25. In the embodiment shown, website 35 is a host computer controlled by operating system 38, webserver 37 and the present invention's Active Security Responder (ASR) 36. Disk storage 40 is shown connected to website 35 and containing only a web root 42 and, optionally, dummy website pages. ASR 36 is in communication over private network lines 10 with another computer 39, which is running the present invention's pseudo URLs—PURLs 39a, its positive information profiling system PIPS 39b and its virtual page publication system VPPS 39c.

In the embodiment shown in FIG. 1, ASR 36 controls all the functions of web server 37, including:
 intercepting all requests for web pages and web page components;
 examining the request for evidence of interception or impersonation;
 validating the client and evaluating the client's profile;
 evaluating a page profile for the requested PURL;
 carrying out any actions associated with the client profile or page profile;
 preparing and filing any logging or auditing information as required;
 publishing the information selected by the above process as the requested web page using VPPS 39c, and
 using VPPS to examine the web server file system on storage disk 40 for recently created files to be either deleted or stored in an "isolation ward" for further examination.

In the embodiments shown, the operating system is Microsoft's WINDOWS NT™ system and the web server is Microsoft's INTERNET INFORMATION SERVER IIS™ server using PC compatible processors or workstations.Those skilled in the art will appreciate that other computers, storage systems, operating systems and web servers or networking techniques could be used without deviating from the spirit of the invention.

Figure 5:
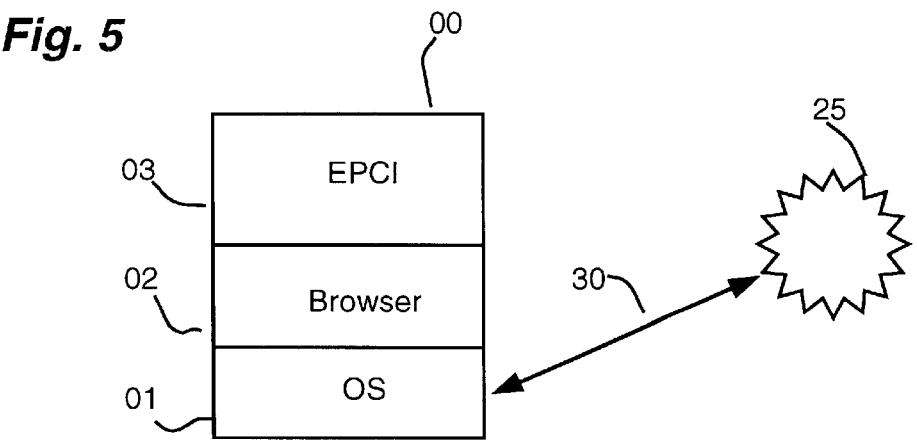
FIG. 5 is a block diagram of the extensible positive client identifier of the invention in operation at a client terminal.

Turning briefly to FIG. 5, it can be seen that a requesting client terminal 00 typically includes a personal computer or workstation controlled by an operating system 01, a web browser 02 and the present invention's extensible positive client identifier software EPCI 03 communicating over public communications lines 30 with Internet 25. Those skilled in the art will appreciate that a terminal 00 or even a host computer 35 can be any device capable of communication over a network to send and receive data—from handheld wireless devices to computer mainframes. Similarly, those skilled in the art appreciate that the functions provided by operating systems and web browsers can be replaced by other software, such as custom software without deviating from the spirit of the present invention. Similarly, while the embodiments shown assume the use of a public Internet network, those skilled in the art will appreciate the it the present invention can also be used in private, internal networks such as internal Wide Area Networks or Local Area Networks (WANs and LANs), or intranets or extranets.

Returning to FIG. 1, the first request sent to it from a terminal is evaluated by ASR 36 as a public request and the appropriate public web page is returned to the client with an instruction for the client to send its client identifier key (CIK) with the next request for information. In the embodiments shown, every page sent by ASR 36 will contain the instruction to send a CIK identifier. If the client has no EPCI 03 software installed at its terminal 00, then ASR 36's request for the client to send a CIK key is ignored by the other software at terminal 00, and further communication between that terminal 00 and ASR 36 is public, although as mentioned, all the pages sent by ASR 36 will contain a "send your CIK" instruction.

If the EPCI 03 software has been installed at the user terminal 00, ASR 36 of the present invention will generate a public response page for the first request from terminal 00, along with instructions to terminal 00 to send its client identification key—CIK—with the next request. If the client at terminal 00 does have EPCI 03 software, it will examine the request to send a CIK to see if the client at terminal 00 has a relationship with the requesting server ASR 36.

If the EPCI 03 software at terminal 00 determines there is no relationship, then the request to send its CIK identifier is ignored by EPCI 03 and all further communication between ASR 36 and terminal 00 is handled on a public basis, even though in the embodiment shown, ASR 36 continues to send a request for terminal 00 to send its CIK identifier.

If EPCI 03 at terminal 00 determines that there is a relationship (by verifying that in its own copy of the CIK), then EPCI 03 validates itself, as described in more detail below, and provides ASR 36 with its CIK, thereby allowing ASR 36 to identify the client at terminal 00. Once both have established that a relationship exists between them, the next and subsequent web pages will be sent to terminal 00 according to the appropriate evaluation of that client's security levels and the levels of the data requested, as will also be described in more detail below. In the embodiment shown, this also means the earlier sent public information will be refreshed with the information the security levels entitle that client to receive.

FIG. 6 shows the typical contents of a client identifier key (CIK) generated by EPCI software 03. Each field, such as the Authorizer Personalization Key (APK) for this relationship, or the Authorizer Client Activation Key (ACAK) for this relationship, is given a numeric value by EPCI software 03. FIG. 7 illustrates a partial hypothetical CIK 120 in numeric form.

Returning to FIG. 1, if the user terminal making the request is a valid one, its EPCI 03 software will self-check its client identifier key (CIK 120) as described in more detail below), and return a newly generated CIK 120 to ASR 36. In the embodiment shown, CIK 120 contains several items that are unique to this particular hardware and software configuration of user terminal 00. The effect of this is that the valid client terminal 00 will self-check itself and identify itself to ASR 36 as a valid client. If a hacker or interloper has stolen the EPCI 03 software, and installed it on terminal 13, that same software will generate a new CIK for terminal 13 which uses fields that are unique to the hardware and software configuration of terminal 13, compare it to the previous CIK created for terminal 00's unique hardware and software configuration and silently identify itself to ASR 36 as a hacker or impersonator by setting such an indicator in the new CIK it generates. At that point, ASR 36 will treat requests from terminal 13 according to the host server's security policy for impersonators. In the embodiment shown, the security policy selected uses a dummy website containing innocuous public information to satisfy any more requests from the hacker at terminal 13. In this example, it might appear to the impersonator at terminal 13 of FIG. 1 that he or she is in communication with a website 50, which is serving webpages stored on dummy disk 55 or on disk 40. This makes it appear to the hacker that he or she has been successful, when that is not in fact the case.

The embodiments shown enable an entity to implement security policies which do not reveal the detection of imper-sonation to the impersonator. In the embodiments shown, the present invention augments security policies that make it appear to an interloper at almost every step that he or she has been successful, when, in fact, the opposite is true. Those skilled in the art will appreciate that some of the more obvious policies, such as informing the intruder that he or she has been detected and denying access could be implemented as well at various stages without deviating from the spirit of the invention. For example, a user might wish to deny access in a manner visible to the interloper without indicating to the interloper that he or she has been detected.

Figure 4A:
FIG. 4A (Prior Art) is a block diagram of a standard uniform resource locator (URL) of the prior art.
Figure 4B:
FIG. 4B is a block diagram of a Pseudo Uniform Resource Locator (PURL) of the present invention.

Now turning to FIG. 4A (Prior Art), a standard URL 110 is shown. This particular URL points to the location "overview.html" which is the address of a web page stored on disk 40 of an ordinary web server. FIG. 4B, in contrast shows a pseudo-URL, PURL 39*a* of the present invention which appears identical to the standard URL of FIG. 4A (Prior Art), but does not point to any web page at all. Instead, it comprises a list of tasks stored in a private location to be performed in response to this request and the user's and the data's profiles.

The present invention includes a positive information profiling system PIPS, which enables the entity using the invention to create an account profile for all content and all clients so that data can be matched to requests for information. PIPS is described in more detail below. For the purposes of FIG. 4B, however, PURLs evaluation PURLS 39*a* interacts with PIPS 39*b* to determine what information can be sent to a particular requesting client. If the request from the user's PC terminal is a valid request for employee salary data, from a current employee, then the client profile for that employee might indicate that he or she has read-only access to his or her own salary data. If the employee requests data about the CEO's salary data, PURL 39*a* may apply the corporation's profile for that employee to deny access to the CEO's salary, and instead supply the requesting employee's salary data. It would appear to the employee that the CEO and the employee have the same salary, when this is not so.

In the same way, PURLs can be used to select innocuous public data to be returned to a detected interloper, so that the interloper may be led to believe he or she has successfully breached the site. For example, if the interloper requests the CEO's salary data and the entity owning the website is a publicly held company, the latest publicly known data about the CEO's salary might be displayed to the interloper, while the CEO requesting his or own salary might be given the most current values.

Turning back to FIG. 1, virtual page publication system VPPS 39*c* of the invention provides the pages or content to be served in response to the request as determined by the PURLs 39*a* and PIPs 39*b* evaluations of the request and the data. VPPS 39*c* of the invention generates the proper responses and stores them as temporary pages or data on disk 40, which is accessible to web server 37. The virtual page is sent to the requesting client as the requested URL (and in encrypted form, if appropriate) and deleted from the system 35 and its associated storage disk 40. The source information used to generate virtual pages is stored at a location inaccessible to the web. In the embodiment shown this is computer 39 of FIG. 1, which is connected by a private network connection 10 to host computer 35. In another embodiment, if the server machine has sufficient Random Access Memory (RAM)—internal memory accessible directly to the central processing unit (CPU)—or "RAM disk" facility, the information need not be stored at all but simply sent from RAM's internal memory. Those skilled in the art will appreciate that various types of media can be used for storing information other than those mentioned here. Magnetic Tapes, for example, or RAID disk systems, writeable CD-ROM disks, or flash memory and so on could be used.

Still in FIG. 1, once the temporary page files have been deleted from disk 40 which is accessible to the Internet, VPPS 39c keeps two security vigils. First, it checks to see if there are any files, other than the web root and the dummy security pages (if present) that are more than some specified amount of time old. If it finds such a file, VPPS 39c can be directed by the security policy for that host to either delete such a file completely or move it to an"isolation ward" area specified by the user so it can be checked. This significantly lowers the risk of successful file deposition attacks on the web site. Files other than the ones that are supposed to be there (web root and dummy pages) are either deleted or, in effect, moved into"quarantine" and deleted from disk 40. In the embodiment shown, the invention also checks all files on disk 40 to see if the valid ones have been changed in that predefined interval as well. If they have been changed, they may have been corrupted, so they, too are either deleted or moved into isolation areas and, if so specified, the last valid content substituted for them. If the modified files so detected are those belonging to the web root or dummy pages, ASR 36 of the invention can also be guided by the security policies for the website in the handling of them. If no time has been specified by the user for the predefined interval, a default time, such as 60 seconds is used.

The second type of security vigil carried out by VPPS 39c is for any new folder or directory created on the relevant storage disk(s). In the embodiments shown, these are deleted or moved to quarantine immediately, as soon as they are detected, without waiting for any interval.

Still in FIG. 1, while computer system 35 here is shown as a single website host computer, the present invention can be used to manage security for several different networks and host computers at one or more locations. This is shown more clearly in FIG. 16. There it can be seen that one computer site 35f might be a multiple website host which provides web services to companies x, y and z, over private networks 10x, 10y and 10z. In this example, disk 40 contains web roots x, y, and z for the respective companies. Terminal 00 might be a terminal for an employee of company x, and terminal 05 might be one for an employee of company y.

In the embodiment shown, ASR 36 of the present invention establishes security for each company's website by building and managing the security relationships between the company information stored off the Internet and valid clients such as employees at terminal 00 making requests over the Internet. In this embodiment, each company uses its own copy of ASR 36 (ASRx, ASRy or ASR z) to define its own security policies, access levels and procedures. While the examples discussed so far are directed to the Internet, those skilled in the art will appreciate that the present invention can also be used in private networks, such as internal corporate networks, or other forms of network systems. ASR 36 can also be installed on several machines at different sites for handling security for just one entity, as well.

Figure 16:
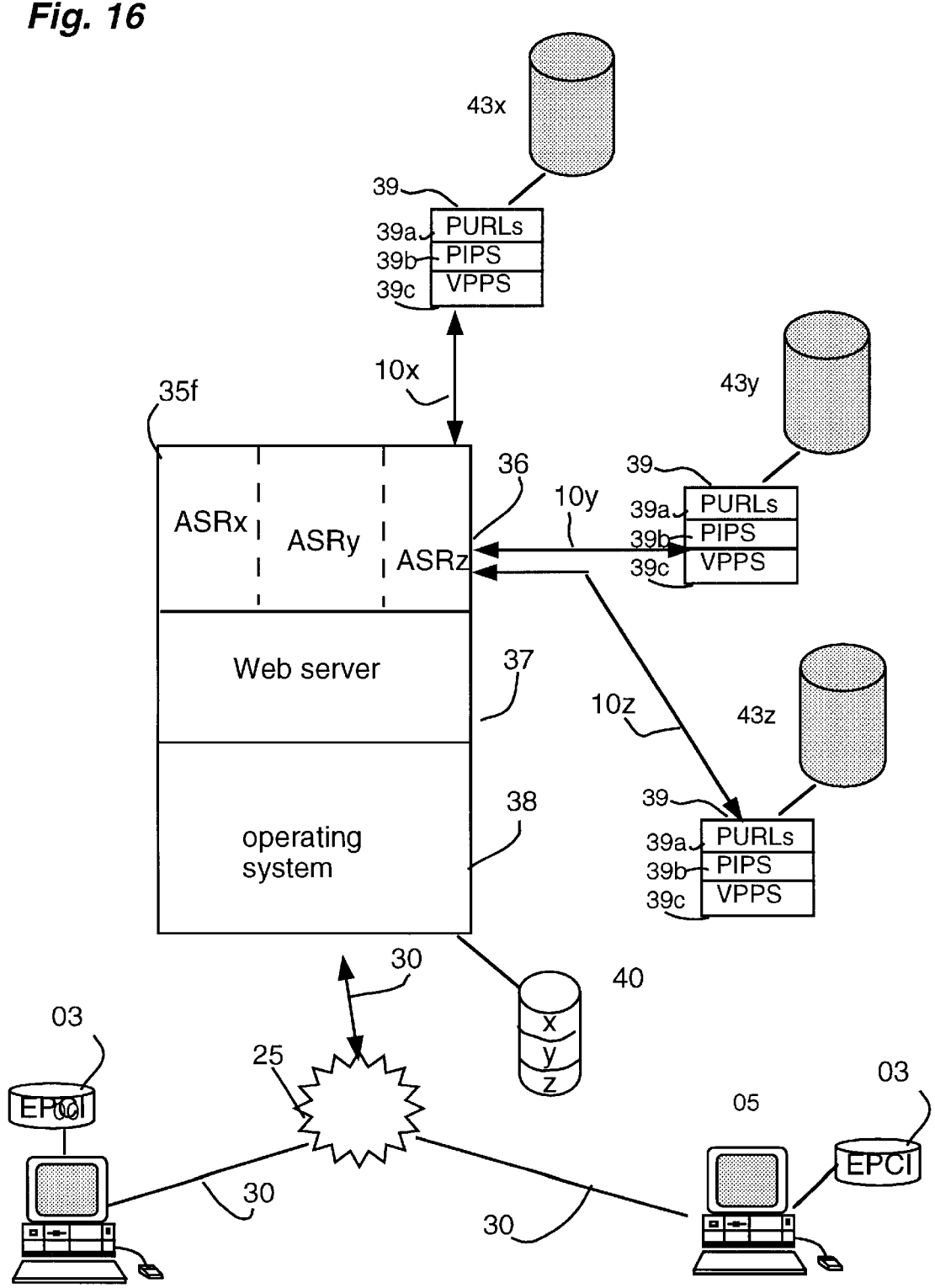
FIG. 16 is a block diagram showing the invention configured for use by multiple different entities.

In addition, and still in FIG. 16, the installation and use of ASR36 creates no visible difference to the outside world. The websites or locations using its services will generally appear the same to external clients or requesters as they would if the invention were not installed. At the host web site(s), each entity using the invention does need to allocate security levels to information sources.

In the embodiments shown, this allocation of security levels is done through the profiling system PIPS 39. As seen in FIG. 16, each entity x, y, or z, is able to create its own secure profile information on its own systems which are not directly exposed to the Internet.

At the outset of use, each entity using the invention installs ASR 36 software at the website host it is using (if the ASR 36 software is not already present) and the invention's EPCI 03 software at each client terminal 00 which is to be allowed access beyond the publicly available data.

Figure 12:
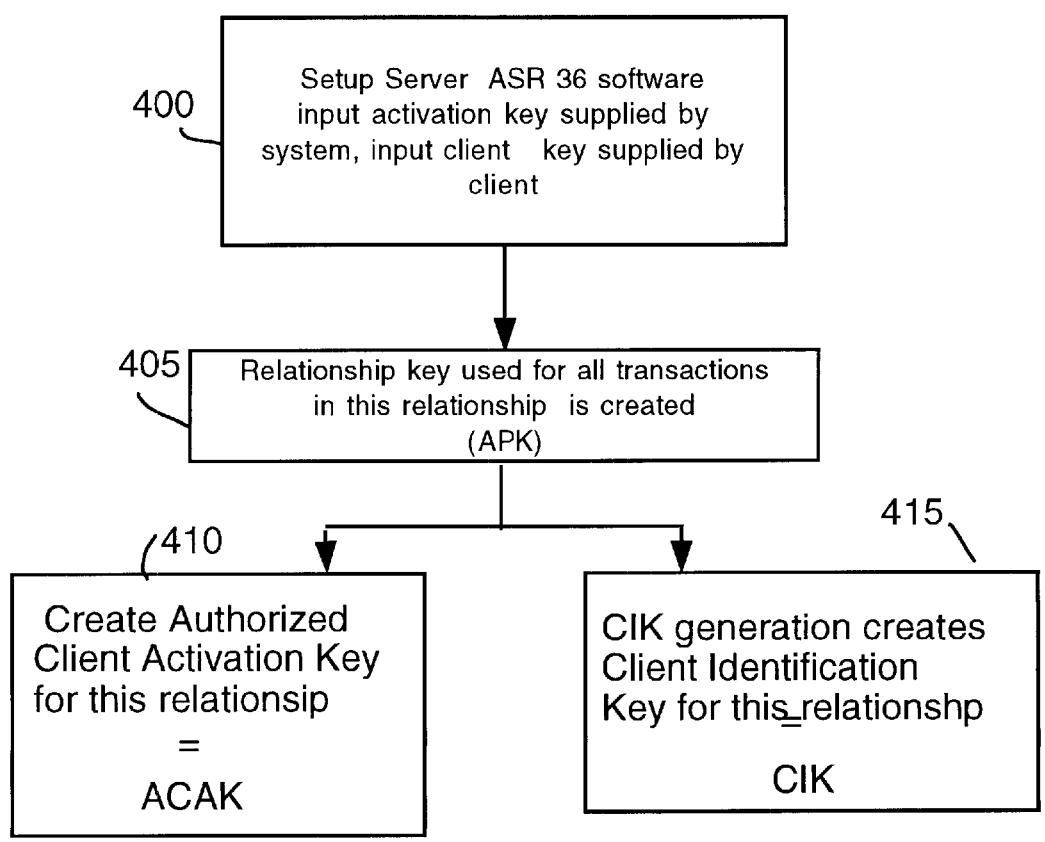
FIG. 12 is a flow diagram of the setup for the invention at a network location.

With reference now to FIG. 12, a block diagram of the setup of ASR 36 is illustrated. At block 400, the ASR 36 software is setup for this entity. In the embodiments shown, each entity's copy of ASR 36 is given an authorized server activation key (ASAK). An ASAK is a unique string of 48 or more characters supplied with the product license for that entity. It is used to activate the configuration of the invention for that entity. A request to enter the ASAK is made when the ASR 36 product is first used. A further request is made of the purchasing entity to enter 30 or more characters of the entity's own devising. This is called the client confidence key, or CCK. In the embodiments shown, this could be any kind of key which the corporate entity believes will assist in uniquely identifying it. In the embodiments shown, this client confidence key CCK is encrypted as it is entered and kept in encrypted form by ASR 36. This means that ASR 36 does not"know" the unencrypted form of the CCK, and thus minimizes the risk of"backdoor" access to protected information even by the licensor of the product.

Next, at step 405 of FIG. 12, ASR 36 will generate its own authorized personalization key (APK) for this corporate entity by combining the ASAK and the CCK. The APK is unique to each installation of ASR 36 of the invention and is used to:

differentiate one ASR 36 server from another ASR 36;

provide a basis for generating unique authorized client activation keys (ACAKs) for clients of that ASR 36; and provide a unique basis for encryption for communication with clients of that ASR 36, if desired.

In the embodiments shown, the user entity (here corporation x, y or z) is required to store a copy of its CCK and ASAK for use if there is ever a need to re-install the system. If the APK that is generated for an ASR 36 is ever changed, then none of the clients will have privileged access until they have all been issued with new ACAKs based on the changed APK.

Also in the embodiments shown, an authorized client activation key, ACAK must be generated for each client and will contain the APK and a unique identifier for that client. A new client is issued client identification key, (CIK) generation software and is also given its unique ACAK. When the client first runs the CIK generation software at its client terminal 00, it is prompted to enter its ACAK. The CIK generation software at that client terminal 00 then creates a unique CIK 120 for that client terminal and exits. No further client activation is required.

In the embodiments shown, this procedure may be repeated by the user for relationships with any number of different servers such as ASRy or ASRz of FIG. 16. The same CIK generation software must be used but the ACAK for each different server ASR 36 must be different.

Figure 17:
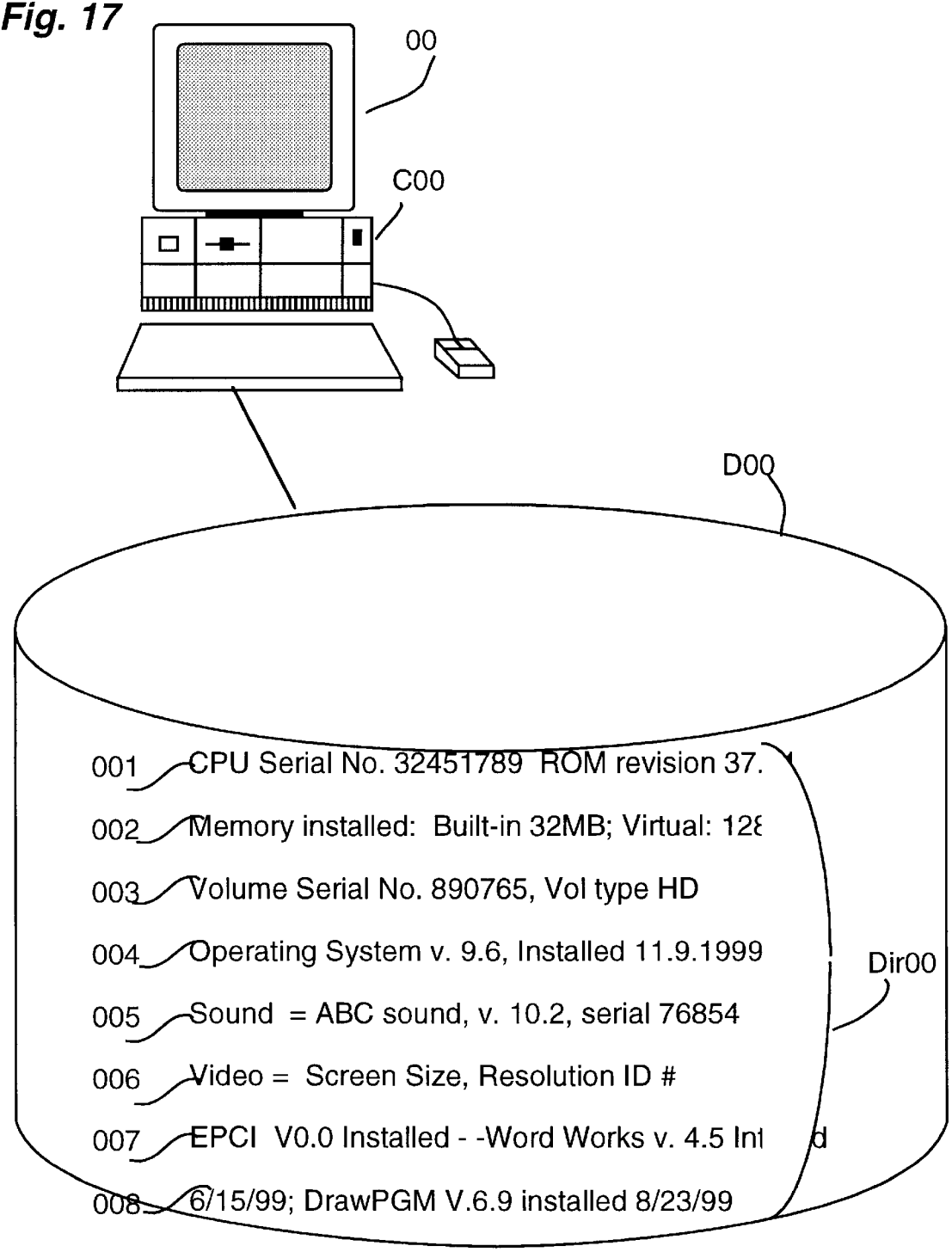
FIG. 17 is a block diagram of typical contents of a storage mechanism at a client terminal site.

Referring now to FIG. 17, some of the elements that can be used by the present invention's EPCI 03 software installed at terminal 00 to create a CIK 120 are shown.

In this example, it is assumed a client who is using the EPCI 03 software at his or her client terminal 00 is also using a personal computer C00 as his or her terminal 00. In exaggerated form, a disk D00 is shown which is attached to personal computer C00. Disk D00, in turn, contains a directory Dir00, which contains information about this particular computer C00 and its installed hardware and software components. For example, at line 001 information such as the central processor unit (CPU) serial number of computer C00 is stored, along with identification about the latest Read-Only-Memory (ROM) Revision made to that CPU. In addition, this example shows at line 002 that computer C00 has 32 megabytes of memory built-in and has configured its memory management to treat that as 128 megabytes of virtual memory. The volume serial number of disk D00 is given at line 003, along with an indicator of its type—HD for hard drive, as distinguished from removable media drives, such as floppy disk drives. Dir 00 also indicates at line 004 that this computer is using Operating System version 9.6 which was installed on Nov. 9, 1999. Dir 00 also shows, at line 005 that sound capability from ABC sound has been installed, with it version number and serial number. Next, at line 006, the particulars of the type of video display are given. Finally, starting at lines 007 and 008, a list of the software programs installed on that computer, possibly with their serial numbers and installation dates is stored. Those skilled in the art will appreciate that other such identifying characteristics for a client terminal or client requestor can be used without deviating from the spirit of the invention.

From the example of FIG. 17, it can be seen that a considerable amount of information about this particular computer system C00 is stored on disk D00. As mentioned earlier, it is also probable that the person using this system has his or her on logon name and password which is also stored somewhere in the system, depending on the type of operating system and local security used. Additionally, most present day computer systems whether handheld or mainframe are capable of keeping track of the current date and time at that computer and making that information available to programs running in that computer. If the computer is connected to a network such as an internal TCP/IP network, it also contains IP addressing information about itself.

Now turning back to FIG. 6, it can be seen that the CIK generation software of the present invention makes use of some or all of this kind of information and more to create a client identification key, CIK 120, that is unique to this particular user's installation, as illustrated in FIG. 6's Table T2. As mentioned earlier, the first access from this client terminal 00 is usually a public access, in which terminal 00 does not send a CIK. ASR 36 decides whether a relationship with terminal 00 has been established by the setup processes described above. If a relationship has been established, ASR 36 will automatically refresh the web page previously sent as a public page to obtain the correct CIK 120 from the client at terminal 00.

Figure 8:
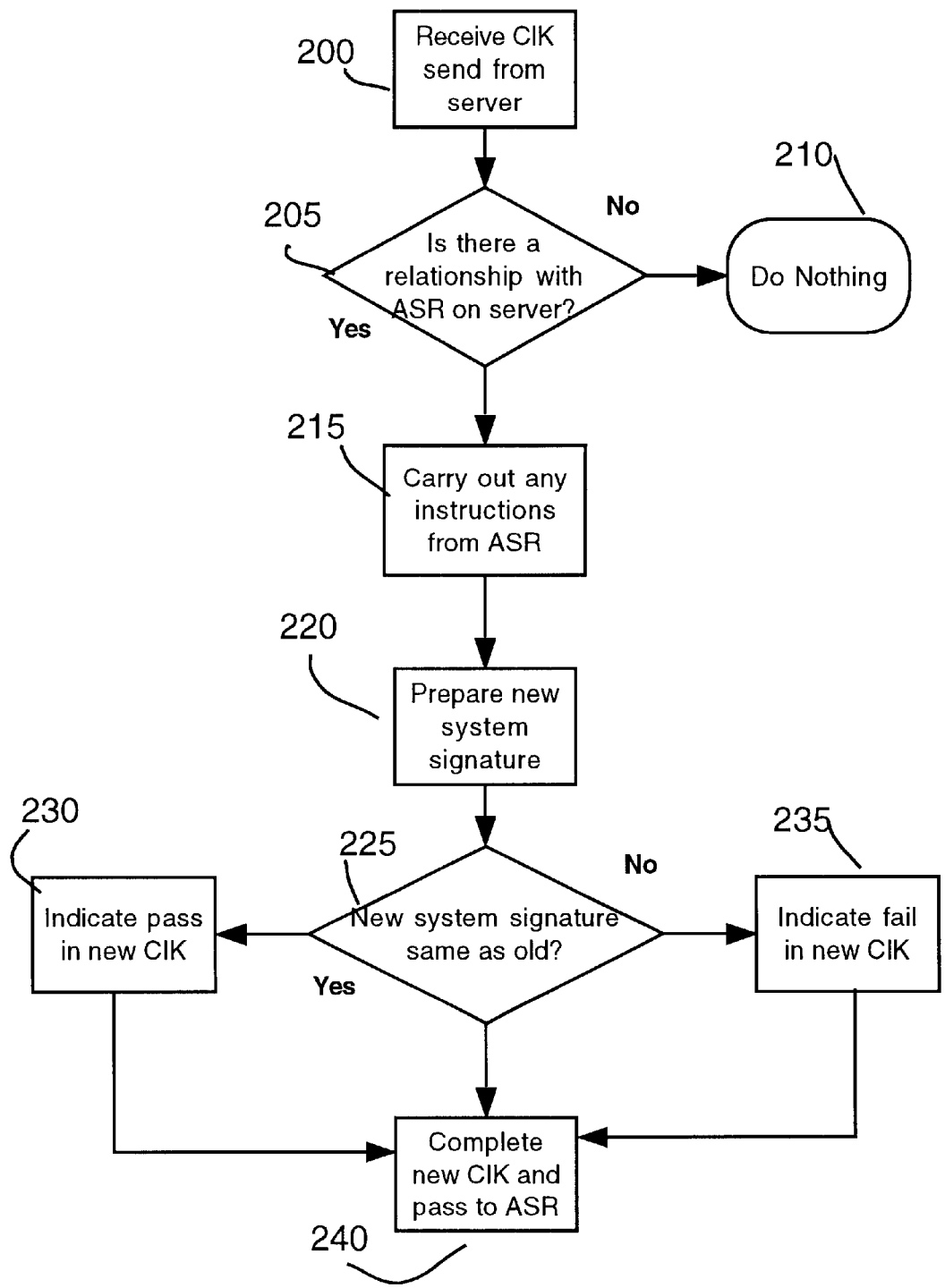
FIG. 8 is a flow diagram of the extensible positive client identifier of the invention.

This is shown in more detail in FIG. 8, which is a flow diagram of the processing of EPCI 03 at terminal 00. At step 200, EPCI 03 receives a "send your CIK" request from ASR 36 running on the host/server machine. In the embodiments shown, every request for a page component is answered within an appropriate version of that page component plus a request for the client to send its CIK 120. The request also contains the APK for that particular server ASR 36. At step 205 EPCI 03 checks to see if there is a relationship with that particular server ASR 36. It does so by taking the APK sent with the request and comparing it with its own copy contained in the client's CIK file created by the CIK generation software. A client will have the APK from each server ASR 36 that provided it with an ACAK. If there is no match, and therefore, no relationship, EPCI 03 does nothing, at step 210. However, if there is a relationship, then EPCI 03 proceeds to step 215 to carry out any instructions from the host running the requesting ASR 36. It should be noted here that the instructions can be as simple as "reply with CIK", to commands to run several programs or tasks and then reply with CIK. That is, the step of carrying out instructions from ASR 36 sent from the host server machine can be used to install new software at terminal 00, run other software, delete software or data, and so on. This step is not restricted solely to security checking. This feature provides entities using ASR 36 with significant options for communicating with or controlling the remote terminals.

Still in FIG. 8, once any instructions have been carried out, EPCI 03 running at terminal 00 prepares a new system signature at step 220. In the embodiments shown, a system signature is some extensible combination of the unique information stored locally at terminal 00. That is, some combination of the information described in FIG. 17 about the particular configuration of terminal 00 is used to create the system signature. For example, and referring back to FIG. 17, the system signature for this kind of computer C00 might include the serial number of the hard drive shown at line 003, the installation date of the operating system shown at line 004, the sound card serial number shown at line 005, and the version number of the DRAWPGM, shown at line 008. Different types of computers might have different system signatures. In the embodiments shown, EPCI 03 provides positive identification of the client machine being used. However, a system administrator might wish to further authenticate the person using that machine by adding a logon and password field to the system signature, for consistency with other internal procedures. In addition, other elements can be used by the present invention to form a unique system signature, such as smart card data or biometric identifiers, and so on.

Returning to FIG. 8, EPCI 03 checks at step 225 to see if the new system signature is the same as the old system signature stored in its CIK file. If it is, a new client identification key CIK 120 is created at step 230, indicating that the self-evaluation done by EPCI 03 on this machine passed the test and at step 240, the newly created CIK 120 is passed to ASR 36. If the system signature is not the same as the old one from a valid client, a new CIK 120 is created which includes a pass or fail indicator (see CIKSTATUS at Table T2 of FIG. 6), and new CIK 120 is passed to ASR 36 at the host. Note that this self-evaluation does not notify anyone at terminal 00 of the pass or fail status. In other words, the self-evaluation is done "silently" as it were.

Figure 18:
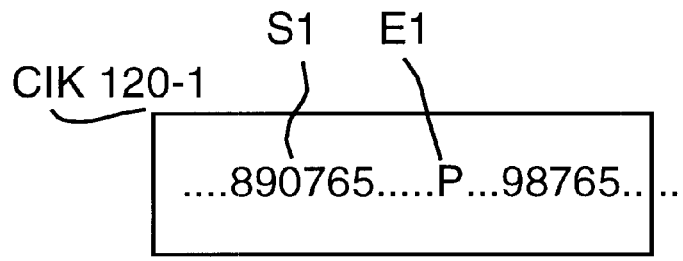
FIG. 18 is a block diagram of illustrative Client Identification Keys (CIK) generated by the present invention.

Turning momentarily to FIG. 18, examples of passing and failing CIK's 120 are shown. At CIK 120-1, the volume serial number of the hard drive D00 attached to terminal 00 is shown in system signature S1 as 890765, which matches the one shown in FIG. 17. Assuming all the other portions of the system signature S1 matched the original one, a PASS indicator E1 is inserted into new CIK 120-1.

Still in FIG. 18, if a hacker has managed to copy the EPCI 03 software and the data transmitted from terminal 00, for creating keys, when the bootlegged copy of EPCI and its files is installed at the bootlegger's terminal, it will create a new CIK 120-2, which uses the serial number S2 of the hard drive attached to the bootlegger's terminal. This will not match the original system signature created for terminal 00 and passed from the host, so EPCI 03 will insert a fail indicator E2 in the new CIK 120-2 it generates. When the stolen software returns its new CIK 120-2, the intruder security policy for that server ASR 36 is activated.

Back in FIG. 8, once the self-checking performed by EPCI 03 has been completed, the new CIK 120 is passed to the host computer 35, at the next communication with ASR 36 on the host 35. Thus, self-evaluation is performed by EPCI 03 each and every time any data or object or request from terminal 00 is made to ASR 36 at host computer 35.

Figure 9:
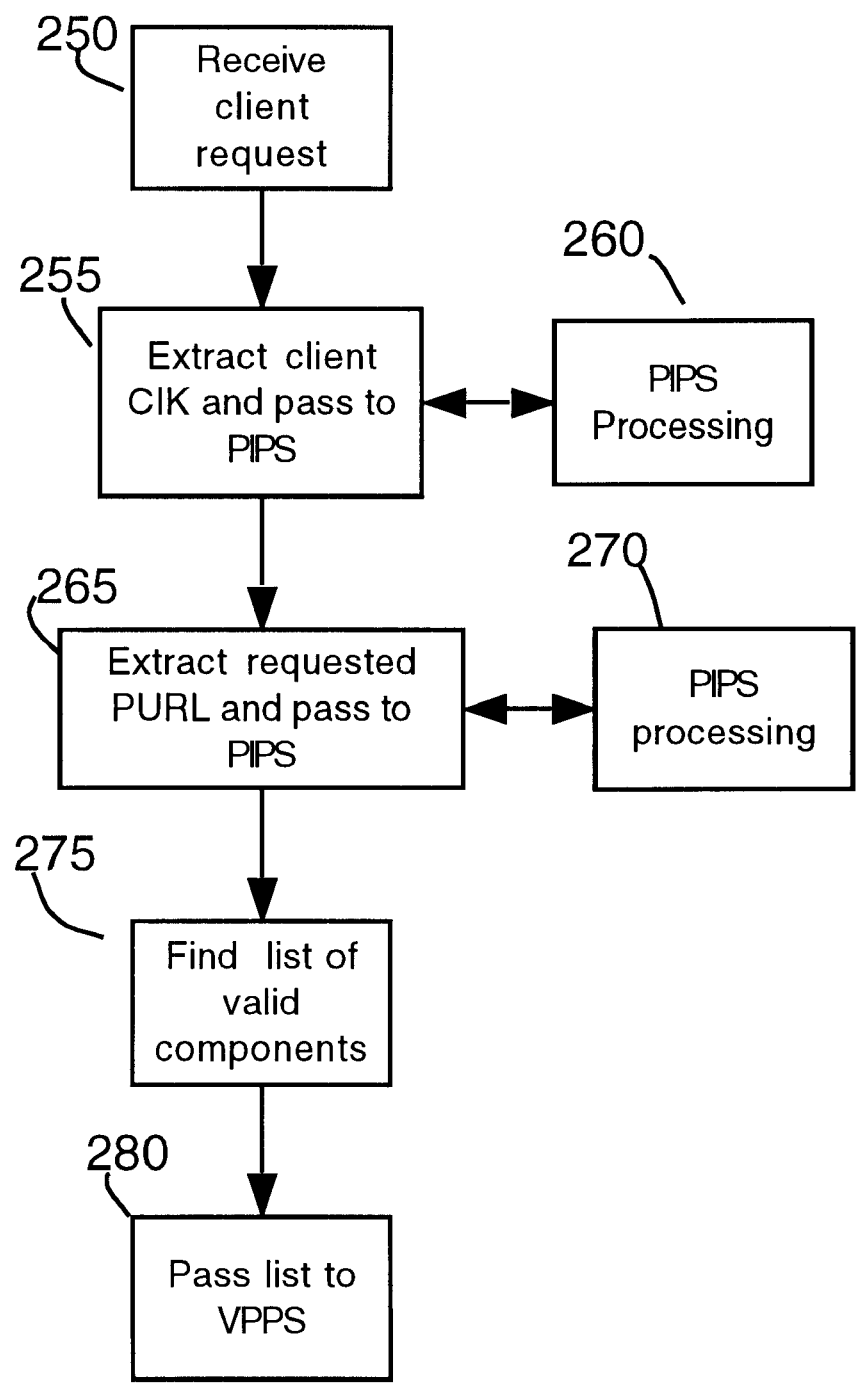
FIG. 9 is a flow diagram of the PURLs processing of the invention.

Turning now to FIG. 9, when ASR 36 receives a request for a data locator—in the embodiment shown, in uniform resource locator format—and CIK 120 from terminal 00, it passes that information to pseudo uniform resource locator processing PURLS 39a. The flow diagram of FIG. 9 illustrates the processing performed by PURLS 39a. At step 250, PURLS 39a for this entity receives the client request from terminal 00, in this example. At step 255, PURLS 39a extracts the client's CIK and passes that to the present invention's PIPS 39b program.

Figure 13:
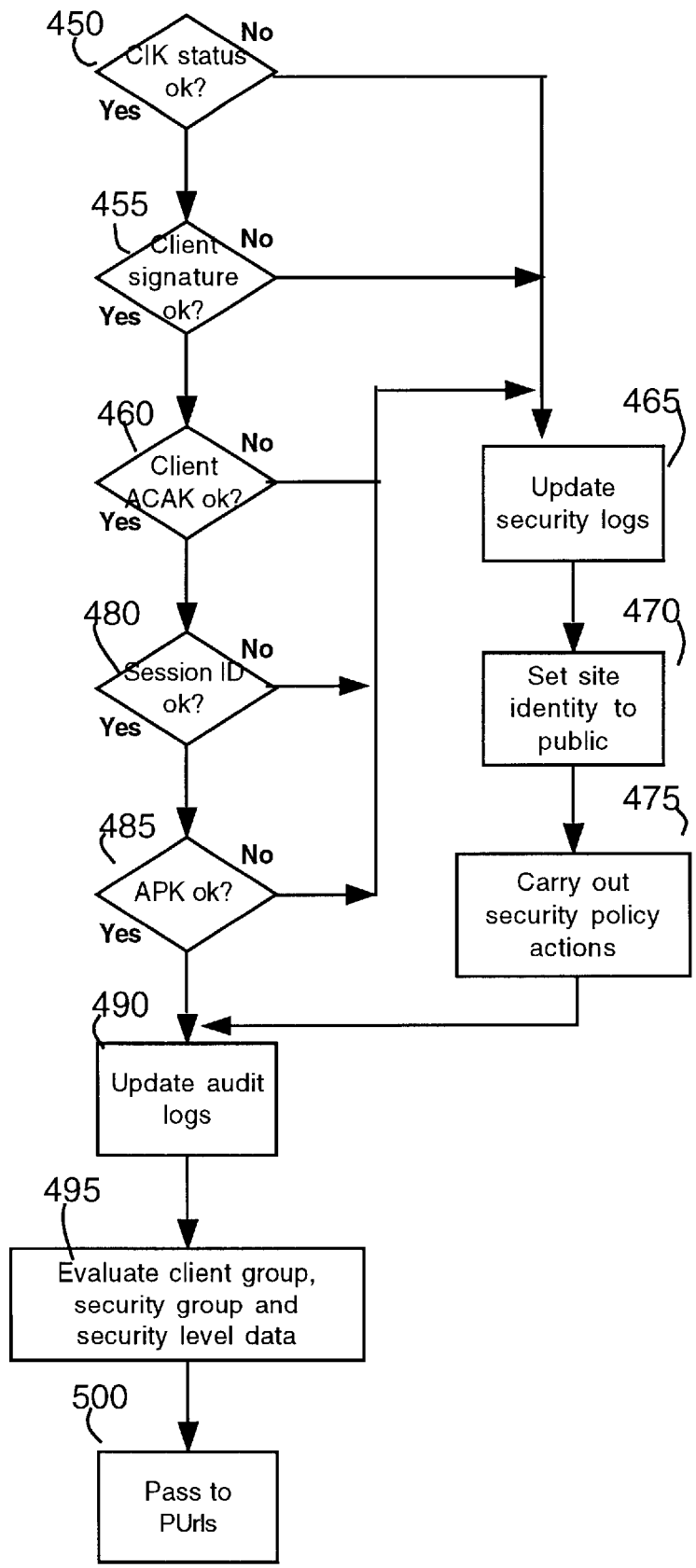
FIGS. 13 and 14 are flow diagrams of the Positive Information Profiling System (PIPS) of the present invention.

Referring briefly to FIG. 13, PIPS 39b at this juncture performs a number of identity checks at decision blocks 450, 455, 460, 480, and 485, checking the CIKSTATUS, system signature, ACAK, Session ID, and APK information. In the embodiments shown, reliance solely on the client CIK may not be sufficient for detecting a skilled hacker who learns how to construct a CIK. Checking other items such session id as well, provides additional safeguards. If the information fails any of these checks, PIPS 39b proceeds to step 465. At 465, since identification has failed on one or more of the checks, the security logs of the present invention are updated. At step 470 the site identity is set to public for this response by PIPS 39b. Finally, now that an identity problem has been logged, PIPS 39b carries out the security policy actions which the user has specified for the particular type of error detected.

Still in FIG. 13, if all the checks have shown successful identification, PIPS 39b at step 490 updates its audit logs, and then evaluates client group, security group and security level data at step 495.

Figure 19:
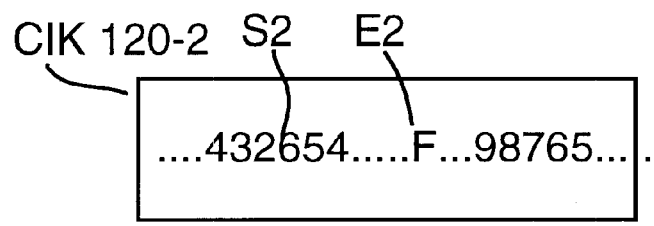
FIG. 19 shows tables illustrating different types of security levels used by the present invention.

Turning briefly to FIG. 19, it can be seen that the present invention allows each page and each client to have a predefined security level. The security level of a page must be matched by that of its intended recipient in order for the page to be published. In FIG. 19, some examples of access levels are shown. Inclusive access table IN00 illustrates a structure in which a higher level of security automatically includes all lower levels. Thus if a client has access level 2, in table IN00, it will automatically have access to levels 0 and 1 as well.

Another option—exclusive access—is shown in table EX00. There a client may have access to only one or two levels, but not to any others. For example, a client with access level B only has access to page level B. A client with access level AD has access only to page levels A and D. These two types could also be used in various combination to provide additional security options.

Also turning now to FIG. 15, a screen display of an account profile for a client is shown. In a similar fashion, a screen display for each page or section of the website can be used to create an account profile of the data secured by the present invention.

Returning to FIG. 13, after the security levels of the client requestor and the security levels of the requested data have been evaluated at step 495, the results of all this checking and evaluation are passed back to PURLS 39a at step 500. At this point, the identity of the requester has been verified (or not) and an appropriate level of response has been indicated, based on the security policy for that entity for that data.

Figure 14:
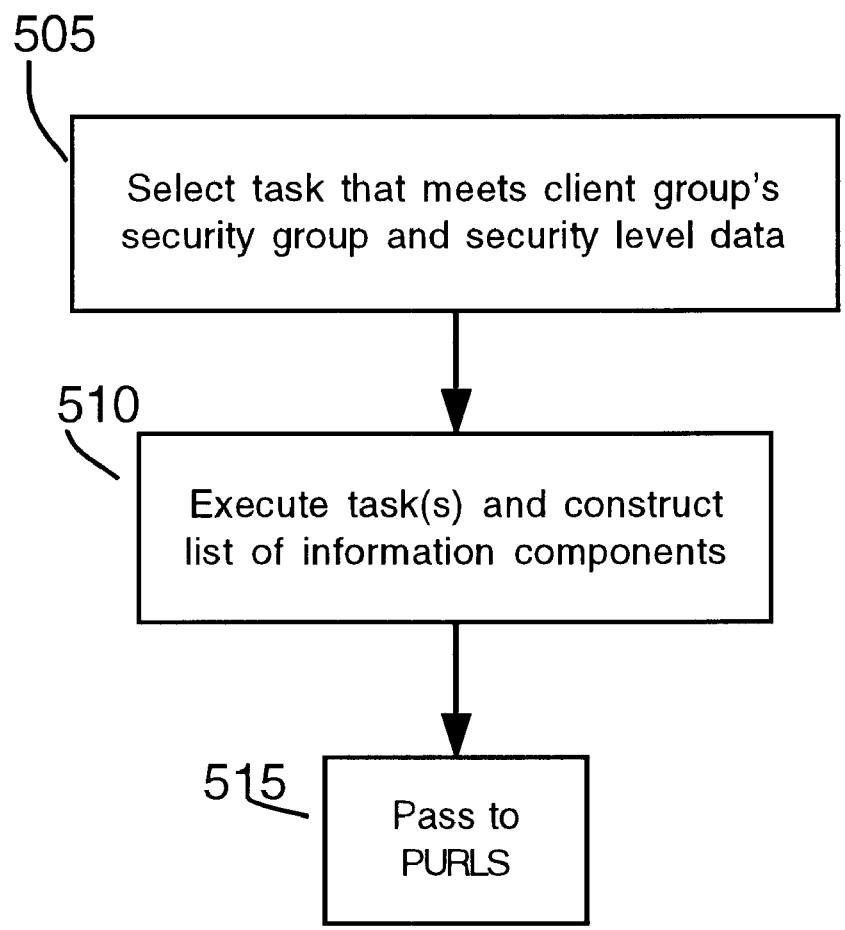

Returning to FIG. 9, at step 265, the requested PURL sent by the client terminal 00 is extracted from the request and, at step 270, is sent back to PIPS 39b for processing. This portion of PIPS 39b processing is diagramed in the flow diagram of FIG. 14. There, at step 505, PIPS 39b selects the task(s) (contained in the request) that meets the client group, security group and security level data. As mentioned earlier, a PURL in the present invention is not the address of data or pages, as ordinary URLs are, but identifies a list of tasks to be performed. At step 510, PIPS 39b carries out those task(s) and constructs a list of information components which will eventually be displayed in a web page or similar result and then, at step 515, PIPS 39b passes this information back to PURLS 39a.

Returning again to FIG. 9, PURLS 39a receives this information and finds this list of valid components at step 275. At step 280, this list is passed to VPPS 39c of the present invention.

Figure 10:
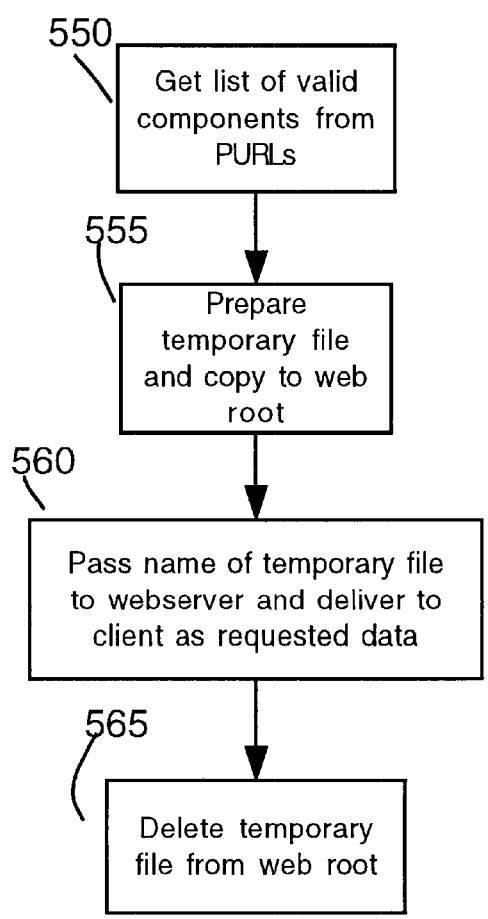
FIGS. 10 and 11 are flow diagrams of the Virtual Page Publication System (VPPS) processing of the invention.

Now referring to FIG. 10, virtual page publication system VPPS 39c processing is shown. At step 550 the list of valid components is received from PURLS 39a. Using that data, at step 555, VPPS prepares a temporary file containing one or more web pages and sends a copy of that temporary file to the web root. (Web root 42 of disk 40 in FIG. 1). Next, at step 560 VPPS 39c passes the name of that temporary file to the webserver (webserver 37 in FIG. 1), which will cause that page(s) to be delivered to the client as the requested data. Next, at step 565, VPPS 39c deletes the temporary file from the web root as soon as the data has been sent on its way. Thus, the web page only exists for a few milliseconds on disk 40 of FIG. 1, which is exposed to the Internet. Those skilled in the art will appreciate that the pseudo locators and virtual publication methods of the present invention could be applied to other network and security systems, in which protected information is only to be given to valid requesters of it.

Figure 11:
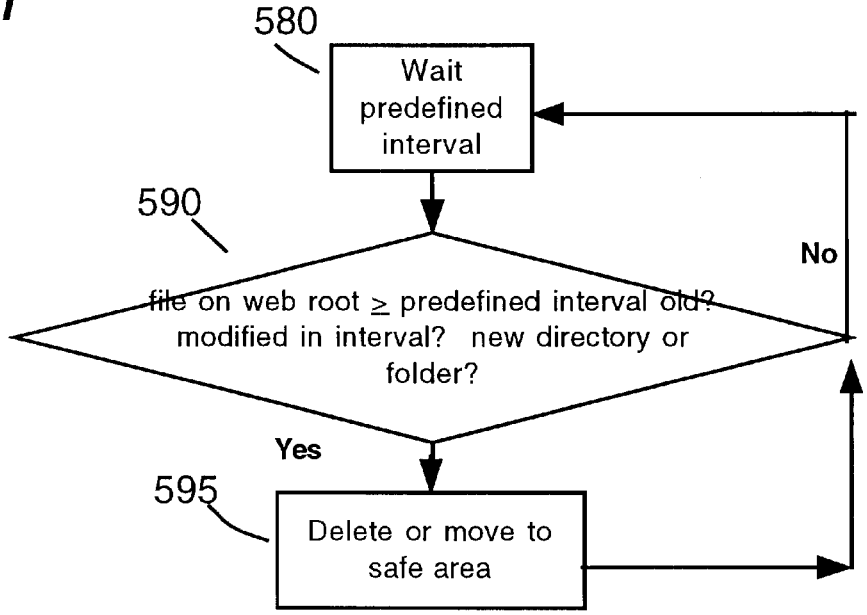

Turning next to FIG. 11, another feature of VPPS 39c processing is shown. Here, VPPS 39c waits, at step 580, some predefined interval specified by the user. In the embodiments shown the interval is usually some small multiple of the "ping time" for an average use. Those skilled in the art are aware that the TCP/IP protocol allows a terminal to send data to a server and measure the time it takes to get to the server, usually a few milliseconds. If the ping time is 10 milliseconds, the interval specified by the user to VPPS 39c might be 20 milliseconds. Usually it is an interval that is just long enough to let a valid message go through and the temporary file stored on the web root to be deleted. Once that interval has expired, VPPS 39c checks at step 590 of FIG. 11 to see if any new file has been created on the disk containing web root 42. If lVPPS 39c determines that a new file has been created and stored there it is automatically assumed to be suspect. Depending on the security policy for the website, VPPS 39c will either delete the file completely at Step 595 or move it to a "safe" area, isolated from both the Internet network and the user's internal network. In this way, file deposition attacks can usually be detected and dealt with immediately. VPPS 39c also checks to see if any of the legitimate files on the web root have been modified. If they have, they, too can be deleted or moved, and at the discretion of the user, the original state of the file can be restored or not. Those skilled in the art will appreciate that the interval used can be varied as circumstances or risk levels (or both) change. As mentioned above, in the embodiment shown, any new folders or directories are deleted or moved as soon as they are detected. Those skilled in the art will appreciate that different actions could be taken at this point, without deviating from the scope of the invention.

Thus it can be seen that in the embodiments shown, the present invention ensures that all users of the network or system it monitors are managed and monitored throughout the duration of their sessions with the server at the host computer and that the information provided to them is appropriate to their pre-defined status. EPCI 03 authenticates the CIK at every access and web page component. The system as a whole is scalable for any number of client entities or number of relationships. It also verifies its own integrity, and reports success or failure through the audit and security logs. It can be used in combination with other security measures such as VPNs, Secure Socket Layer (SSL) technology which encrypts data sent between client and server computers, and X.509 Digital Certificates or Digital Ids. The client identification key is self-checking and aware of its environs so it ensures that if the client identification key is copied and used on another terminal, it will fail, and report the type of failure.

The client identification key responds only to a server with which the client has a known and agreed upon relationship. With the embodiments shown, clients do not need to take special actions such as using logon or passwords. In the embodiments shown, ASR 36 requires that a client must first be enrolled on the secure system by creating a client account as described above.

In the embodiments shown, the present invention is implemented in the C++, VISUAL BASIC™ (from Microsoft, Inc.), and POWERBASIC™ (from POWERBASIC™ Inc. in Carmel, Calif.) languages, but those skilled in the art will appreciate that it could also be implemented in other languages such as Pearl, C, Java and so on. Similarly, while the embodiments shown are implemented in software, part or all of the invention could also be embodied in firmware or circuitry, if desired. Also, as mentioned earlier, while the embodiments shown are directed to use with networks and systems using the TCP/IP protocol, other network or system protocols could be used. Those skilled in the art will also appreciate that the embodiments described above are illustrative only, and that other systems in the spirit of the teachings herein fall within the scope of the invention.

What is claimed is:

1. A method for positively identifying a valid client terminal communicating with a host machine, comprising the steps of:

creating a system signature for the valid client terminal, the system signature including configuration information sufficiently detailed to be unique to that valid client terminal;

generating a first client identification key containing the system signature and storing the first client identification key;

re-evaluating the system signature each time a communication is sent to the host machine requesting information and represented as being from the valid client terminal by creating a new system signature unique to a sending client terminal and comparing it with the system signature stored with the first client identification key, re-evaluating the system signature comprising using pseudo identifiers to request information from the host machine, wherein the host machine treats the pseudo identifiers not as addresses but as lists of tasks to be performed; and generating a second client identification key containing an indicator that informs the host machine whether the sending client terminal is the same as the valid client terminal.

2. The method of claim 1, wherein the step of generating a first client identification key further comprises the step of combining an authorized personalization key from the host machine with the system signature.

3. The method of claim 1, wherein the step of reevaluating the system signature further comprises the step of recognizing and responding to a request from the host machine to send the first client identification key.

4. The method of claim 3, wherein the step of generating a second client identification key further comprises the step of verifying that the client terminal has a relationship with the host machine.

5. The method of claim 4, wherein the step of verifying that the client terminal has a relationship with the host machine further comprises the step of carrying out any instructions sent by the host machine along with the host machine's request to send an identification key.

6. The method of claim 5 wherein the step of carrying out any instructions sent by the host machine along with the host machine's request to send an identification key further comprises the step of executing specified software.

7. The method of claim 5 wherein the step of carrying out any instructions sent by the host machine along with the host machine's request to send an identification key further comprises the step of registering and/or installing new software.

8. The method of claim 7, wherein the step of registering and/or installing new software includes protecting software from illegal copying and/or distribution.

9. The method of claim 5 wherein the step of carrying out any instructions sent by the host machine along with the host machine's request to send an identification key further comprises the step of disabling, crippling and/or deleting one or more of data and applications.

10. The method of claim 5 wherein the step of carrying out any instructions sent by the host machine along with the host machine's request to send an identification key further comprises the step of sending data as directed by the host machine.

11. The method of claim 1, wherein the step of re-evaluating the system signature further comprises the step of sending only non-protected information from the host machine until the sending client terminal is positively identified as a valid client.

12. The method of claim 1, wherein the step of generating a first client identification key includes using the system signature to attain user anonymity.

13. The method of claim 1, wherein the step of generating a first client identification key includes using a digital certificate with the system signature.

14. The method of claim 1, wherein the step of creating a system signature includes using a hashing and/or encryption routine to secure the system signature.

15. The method of claim 14, wherein using a bashing and/or encryption routine includes allowing the hardware configuration to be sufficiently altered without compromising the integrity of the system signature.

16. The method of claim 1, wherein the system signature includes hardware and/or software configuration information.

17. The method of claim 1, wherein the step of storing the first client identification key includes storing the first client identification key at the valid client terminal and/or the host machine.

18. The method of claim 17, wherein the step of re-evaluating the system signature includes re-evaluating the system signature at the sending client terminal and/or the host machine.

19. The method of claim 18, wherein generating a second client identification key includes generating a second client identification key at the sending client terminal.

20. An apparatus for positively identifying a valid client terminal communicating with a host machine, comprising:
- client software for creating a system signature for the valid client terminal, the system signature including configuration information sufficiently detailed to be unique to that valid client terminal;
- the host machine for generating a first client identification key containing the system signature, the first client identification key being stored; and
- a sending client terminal for re-evaluating the system signature each time a communication is sent to the host machine requesting information and represented as being from the valid client terminal by creating a new system signature unique to the sending client terminal and comparing it with the system signature stored with the first client identification key, wherein the sending client terminal uses pseudo identifiers to request information from the host machine, wherein the host machine treats the pseudo identifiers not as addresses but as lists of tasks to be performed;
- wherein the host machine and the sending client terminal cooperate to generate a second client identification key at the sending client terminal containing an indicator that informs the host machine whether the sending terminal is the same as the valid client terminal.

21. The apparatus of claim 20, wherein the host machine combines an authorized personalization key with the system signature.

22. The apparatus of claim 20, wherein the sending client terminal recognizes and responds to a request from the host machine to send the first client identification key.

23. The apparatus of claim 22, wherein the host machine and the sending client terminal cooperate to verify that the sending client terminal has a relationship with the host machine.

24. The apparatus of claim 23, wherein the host machine and the sending client terminal cooperate to carry out any instructions sent by the host machine along with the host machine's request to send an identification key.

25. The apparatus of claim 23 wherein the host machine and the sending client terminal cooperate to execute specified software.

26. The apparatus of claim 23 wherein the host machine and the sending client terminal cooperate to install new software.

27. The apparatus of claim 23 wherein the host machine and the sending client terminal cooperate to delete data.

28. The apparatus of claim 23 wherein the host machine and the sending client terminal cooperate to send data as directed by the host machine.

29. The apparatus of claim 20, wherein the sending client terminal sends public versions of information from the host machine until the sending client terminal is positively identified as a valid client.

30. The apparatus of claim 20, wherein the host machine for generating a first client identification key containing the system signature includes means for combining an authorized product license key with the system signature.

31. The apparatus of claim 20, wherein the sending client terminal for re-evaluating the system signature includes means for sending non-activation information for software installed on the valid client terminal until the sending client terminal is positively identified as a valid client.

32. The apparatus of claim 20, wherein the system signature includes hardware and/or software configuration information.

33. A method for positively identifying a valid client terminal communicating with a host machine, comprising the steps of:
- creating a system signature for the valid client terminal, the system signature including configuration information sufficiently detailed to be unique to that valid client terminal;
- generating a first client identification key containing the system signature and storing the first client identification key;
- re-evaluating the system signature each time a communication is sent to the host machine requesting information and represented as being from the valid client terminal by creating a new system signature unique to a sending client terminal and comparing it with the system signature stored with the first client identification key, re-evaluating the system signature comprising creating information profiles for the user at a client terminal and protected information stored at the host machine, so that only the appropriate levels of access are provided, and creating virtual pages at the host machine to provide substitute information if the profiles indicate the sending terminal is not authorized to receive the protected information stored at the host machine; and
- generating a second client identification key containing an indicator that informs the host machine whether the sending client terminal is the same as the valid client terminal.

34. An apparatus for positively identifying a valid client terminal communicating with a host machine, comprising:
- client software for creating a system signature for the valid client terminal, the system signature including configuration information sufficiently detailed to be unique to that valid client terminal;
- the host machine for generating a first client identification key containing the system signature, the first client identification key being stored; and
- a sending client terminal for re-evaluating the system signature each time a communication is sent to the host machine requesting information and represented as being from the valid client terminal by creating a new system signature unique to the sending client terminal and comparing it with the system signature stored with the first client identification key, wherein the sending client terminal creates information profiles for the user and protected information stored at the host machine, so that only the appropriate levels of access are provided;
- wherein the host machine and the sending client terminal cooperate to generate a second client identification key at the sending client terminal containing an indicator that informs the host machine whether the sending terminal is the same as the valid client terminal, wherein the host machine creates virtual pages to provide substitute information if the profiles indicate the sending client terminal is not authorized to receive the protected information stored at the host machine.

* * * * *